US009830783B1

(12) United States Patent
Kessler et al.

(10) Patent No.: US 9,830,783 B1
(45) Date of Patent: Nov. 28, 2017

(54) OUTPUT DEVICES FOR FABRIC-BASED ELECTRONIC EQUIPMENT

(71) Applicant: Apple Inc., Cupertino, CA (US)

(72) Inventors: Patrick Kessler, Mountain View, CA (US); Daniel A. Podhajny, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/861,371

(22) Filed: Sep. 22, 2015

Related U.S. Application Data

(60) Provisional application No. 62/054,590, filed on Sep. 24, 2014.

(51) Int. Cl.
*H04B 3/36* (2006.01)
*G08B 6/00* (2006.01)

(52) U.S. Cl.
CPC .................................. *G08B 6/00* (2013.01)

(58) Field of Classification Search
None
See application file for complete search history.

(56) References Cited

U.S. PATENT DOCUMENTS

| 5,023,853 | A | 6/1991 | Kawata et al. | |
| 5,043,956 | A | 8/1991 | Tsukada et al. | |
| 6,912,287 | B1 * | 6/2005 | Fukumoto et al. | G06F 1/163 379/430 |
| 8,699,306 | B2 | 4/2014 | Estrada et al. | |
| 8,988,349 | B2 * | 3/2015 | Alberth et al. | G06F 1/163 345/158 |
| 2003/0129905 | A1 * | 7/2003 | Dhawan et al. | B01D 39/083 442/316 |
| 2005/0062486 | A1 * | 3/2005 | Qi et al. | H01B 1/124 324/693 |
| 2011/0263200 | A1 | 10/2011 | Thornton et al. | |
| 2013/0222271 | A1 * | 8/2013 | Alberth et al. | G06F 1/163 345/173 |
| 2014/0111340 | A1 | 4/2014 | Zohar | |
| 2014/0240103 | A1 * | 8/2014 | Lake et al. | G08C 17/02 340/12.5 |
| 2014/0347295 | A1 | 11/2014 | Kim et al. | |
| 2015/0013398 | A1 * | 1/2015 | Taylor et al. | E05B 47/0001 70/20 |

(Continued)

*Primary Examiner* — George Bugg
*Assistant Examiner* — Renee Dorsey
(74) *Attorney, Agent, or Firm* — Treyz Law Group, P.C.; Kendall W. Abbasi (57) ABSTRACT

A fabric-based electronic device may include an electronic device housing coupled to fabric. Control circuitry may be mounted in the electronic device housing and may control the movement of an output device in the fabric that provides tactile output to a user. For example, the output device may include a wire enclosed within a flexible tube. The flexible tube may be intertwined with fibers in the fabric. The wire may include a kink or other irregularity that presses against the inner surface of the flexible tube. When the wire is rotated or moved into an appropriate position, the kink may press against the inner surface of the tube, which in turn forms a protrusion on the fabric. The protrusion may press against the user's body and may therefore be used to obtain the attention of a user that is wearing or holding the fabric-based electronic device.

19 Claims, 8 Drawing Sheets

(56) References Cited

U.S. PATENT DOCUMENTS

2015/0181692 A1\* 6/2015 Jezewski et al. .... H05K 1/0393
  361/679.03
2015/0185764 A1\* 7/2015 Magi ..................... G06F 1/1652
  361/679.03

\* cited by examiner

OUTPUT DEVICES FOR FABRIC-BASED ELECTRONIC EQUIPMENT

This application claims the benefit of provisional patent application No. 62/054,590 filed on Sep. 24, 2014, which is incorporated by reference herein in its entirety.

BACKGROUND

This relates generally to electronic devices and, more particularly, to electronic devices having output devices incorporated into fabric.

Fabric can be provided with metal wires and other conductive fibers. These fibers can be used to carry signals for electrical components. In some arrangements, an electronic device can be formed from a fabric that contains electrical components. In other arrangements, an electronic device may include fabric that does not contain any electrical components. The fabric-based electronic device may be worn or held by a user.

Electronic devices are often provided with the ability to obtain a user's attention through the use of an alert device. For example, an electronic device may include output devices such as vibrating motors, speakers, and/or lights to attract the user's attention.

Challenges may arise when mounting electrical components such as output devices to fabric. If care is not taken, stresses on the fabric will tend to dislodge the electrical components. Short circuits can develop if signal paths are not properly isolated. Overly prominent mounting arrangements may be unsightly.

It would be desirable to be able to address these concerns by providing improved techniques for incorporating output devices into fabric for an electronic device.

SUMMARY

A fabric-based electronic device may include fabric formed from intertwined fibers. The fabric may be coupled to an electronic device housing in which electrical components are mounted. The fabric may be used to hold the electronic device housing against a user's body. For example, the fabric may form a wrist band that holds the electronic device housing against the user's wrist.

The fabric-based electronic device may include one or more output devices that provides output (e.g., tactile output) to a user from the fabric. The output device may include a moveable element such as a moveable wire in the fabric. Control circuitry such as an electromechanical actuator may be mounted in the electronic device housing and may be configured to control the movement of the wire in the fabric.

The wire may be enclosed within a flexible tube. The flexible tube may be intertwined with fibers in the fabric. The wire may include a kink or other irregularity that presses against the inner surface of the flexible tube. When the wire is rotated or moved into an appropriate position, the kink may press against the inner surface of the tube, which in turn forms a protrusion on the fabric. The protrusion on the fabric may press against the user's body and may therefore be used to obtain the attention of the user that is wearing or holding the fabric-based electronic device. If desired, the wire may be rotated repeatedly to create a pulsing sensation from the fabric against the user's body.

DETAILED DESCRIPTION

Figure 1:
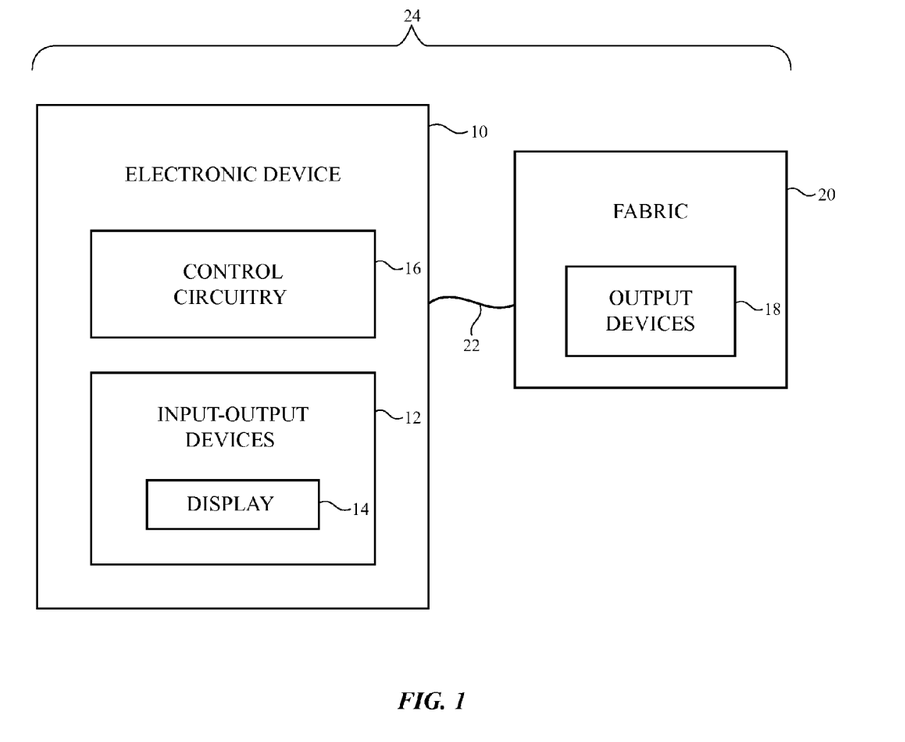
FIG. 1 is a schematic diagram of illustrative electronic equipment having one or more output devices incorporated into fabric in accordance with an embodiment.

A schematic diagram of an illustrative fabric-based system that may include output devices incorporated into fabric is shown in FIG. 1. Fabric-based electronic equipment 24 of FIG. 1 may include an electronic device such as electronic device 10 and fabric such as fabric 20. Electronic device 10 and fabric 20 may be integral with one another, may be detachable or non-detachable from one another, and/or may be physically separate from one another while maintaining the ability to communicate with each other.

In one illustrative arrangement, fabric 20 in system 24 may be an accessory for electronic device 10. For example, fabric 20 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating, may be part of an item of clothing, or may be any other suitable fabric-based item. If desired, fabric 20 may be used in forming part of an electronic device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which fabric-based equipment is mounted in a kiosk, in an automobile or other vehicle, equipment that implements the functionality of two or more of these devices, or other electronic equipment.

Fabric 20 may form all or part of electronic device 10, may form all or part of a housing wall for electronic device 10, may form internal structures in electronic device 10, or may form other fabric-based structures. Fabric-based device 24 may be soft (e.g., the device may have a fabric surface that yields to a light touch), may have a rigid feel (e.g., the surface of the device may be formed form a stiff fabric), may be coarse, may be smooth, may have ribs or other patterned textures, and/or may be formed as part of a device that has portions formed from non-fabric structures of plastic, metal, glass, crystalline materials, ceramics, or other materials.

As shown in FIG. 1, electronic device 10 may include control circuitry 16. Control circuitry 16 may include storage and processing circuitry for controlling the operation of device 10. Control circuitry 16 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 16 may include processing circuitry based on one or more microprocessors, microcontrollers, digital signal processors, baseband processors, power management units, audio codec chips, application specific integrated circuits, etc.

Input-output devices 12 may be used to allow data to be supplied to device 10 and to allow data to be provided from device 10 to external devices. Input-output devices 12 may also include input-output components with which a user can control the operation of device 10. A user may, for example, supply commands through input-output devices 12 and may receive status information and other output from device 10 using the output resources of input-output devices 12.

Input-output devices 12 may include sensors and status indicators such as an ambient light sensor, a proximity sensor, a temperature sensor, a pressure sensor, a magnetic sensor, an accelerometer, a touch sensor, a fingerprint sensor, and light-emitting diodes and other components for gathering information about the environment in which device 10 is operating and providing information to a user of device 10 about the status of device 10. Audio components in devices 12 may include speakers and tone generators for presenting sound to a user of device 10 and microphones for gathering user audio input. Devices 12 may include one or more displays such as display 14. Displays may be used to present images for a user such as text, video, and still images. Sensors in devices 12 may include a touch sensor array that is formed as one of the layers in display 14. During operation, user input may be gathered using buttons and other input-output components in devices 12 such as touch pad sensors, buttons, joysticks, click wheels, scrolling wheels, touch sensors such as a touch sensor array in a touch screen display or a touch pad, key pads, keyboards, vibrators, cameras, and other input-output components. The input-output devices of device 10 may include wired and wireless communications circuitry (e.g., circuitry to support digital data communications, a radio-frequency transceiver and antennas for supporting wireless communications, etc.).

Fabric 20 may be formed from intertwined fibers. Fibers that form fabric 20 may be single-strand filaments or may be threads, yarns, or other fibers that have been formed by intertwining single-strand filaments. Fibers may be formed from polymer, metal, glass, graphite, ceramic, natural materials such as cotton or bamboo, or other organic and/or inorganic materials and combinations of these materials. Conductive coatings such as metal coatings may be formed on non-conductive fiber cores. Fibers may also be formed from single filament metal wire or stranded wire. Fibers may be insulating or conductive. Fibers may be conductive along their entire length or may have conductive segments (e.g., metal portions that are exposed by locally removing polymer insulation from an insulated conductive fiber). Threads and other multi-strand fibers that have been formed from intertwined filaments may contain mixtures of conductive fibers and insulating fibers (e.g., metal fibers or metal coated fibers with or without exterior insulating layers may be used in combination with solid plastic fibers or natural fibers that are insulating). One or more output devices 18 may be incorporated into fabric 20. A user may receive status information, alerts, and other output from system 24 using output devices 18.

Path 22 may form a mechanical, electrical, and/or wireless connection between fabric 20 and housing 24. For example, path 22 may be an attachment structure that physically attaches fabric 20 to electronic device 10 and/or path 22 may be or may include conductive pathways that convey electrical signals between electronic device 10 and fabric 20.

Control circuitry 16 may be used to run software on device 10 such as operating system code and applications. During operation of system 24, the software running on control circuitry 16 may display images for a user on display 14 and may use other devices within input-output devices 12 and output devices 18. For example, the software running on control circuitry 16 may be used to process input from a user using one or more sensors (e.g., capacitive touch sensors, mechanical sensors, thermal sensors, force sensors, switches, buttons, touch screen displays, and other components) and may be used to provide status indicator output and other visual and/or audio output. Control circuitry 16 may use devices 12 and/or devices 18 to provide vibrations, pressure, and/or other physical output (e.g., haptic output). Devices 18 may, for example, include solenoids, vibrators, or other components that provide physical feedback (e.g., vibrations) to a user in conjunction with a button press, touch input, or other user activity. Changes in fabric attributes such as fabric temperature, texture, size, and shape may also be produced using devices 18 to convey output to a user.

In some scenarios, it may be desirable to provide physical output from fabric 20 without attaching a large actuator to fabric 20. For example, motors and other actuators that provide sensory output to a user may be easily housed within device 10 but may be difficult to incorporate into fabric 20 without adding undesirable bulk to the fabric. To provide fabric 20 with output capabilities, output devices 18 may include output structures that are remotely actuated using a controller in device 10 (e.g., a controller that forms part of control circuitry 16). By using electronic device 10 to house the control circuitry and power circuitry that operate output structures 18 in fabric 20, the weight and size of fabric 20 can be minimized and the device may be more comfortably worn or carried by a user.

Figure 2:
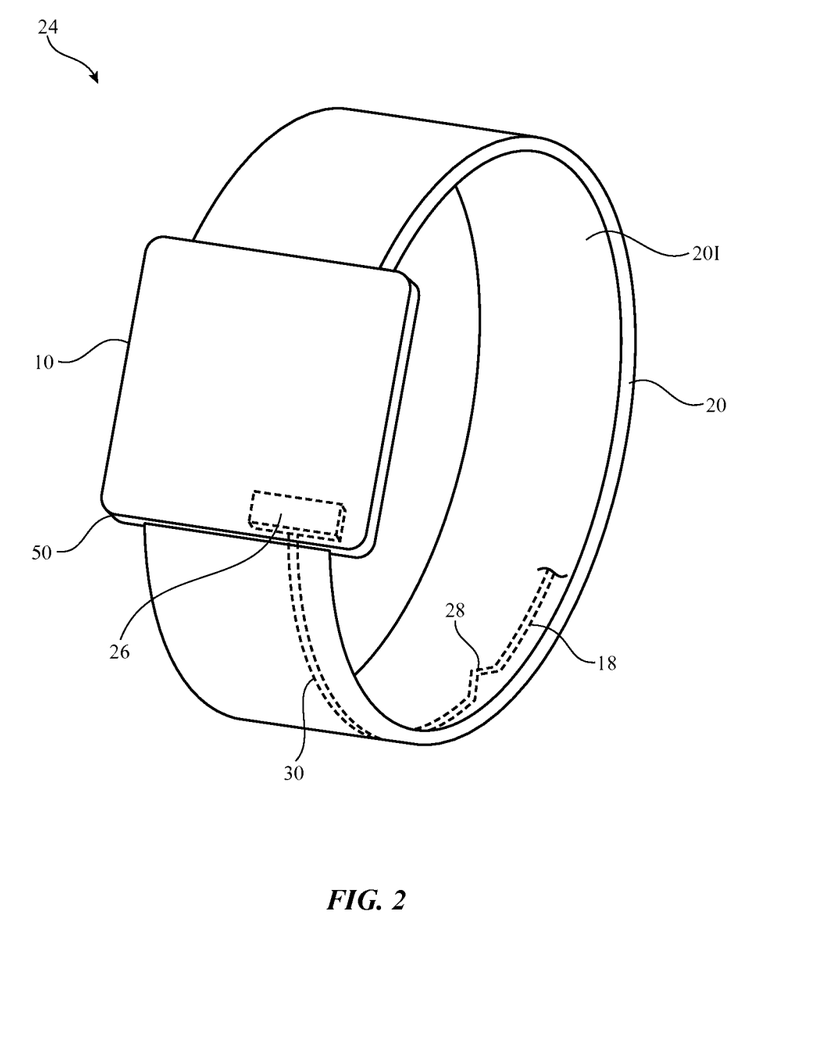
FIG. 2 is a perspective view of illustrative electronic equipment having one or more output devices incorporated into fabric in accordance with an embodiment.

A perspective view of an illustrative fabric-based system in which an electronic device is coupled to and controls output devices in fabric is shown in FIG. 2. As shown in FIG. 2, fabric-based system 24 may include fabric 20 and electronic device 10. In the illustrative example of FIG. 2, fabric 20 is attached to housing 50 of electronic device 10 and may, for example, be used to attach electronic device 10 to some part of a user's body. For example, fabric 20 may form a wrist band, an arm band, a head band, a waist band, or other article that can be secured against a user's body and that can support or hold electronic device 10 in place (e.g., against a user's skin). The arrangement of FIG. 2 is, however, merely illustrative. In general, electronic device 10 and fabric 20 may be integrated with or attached to one another in any suitable fashion. Arrangements in which fabric-based system 24 includes an electronic device 10 attached to a band 20 are sometimes described herein as an example.

System 24 may include output devices such as output device 18 for providing physical output to a user. Output device 18 may include a moveable element such as wire 30 and a controller such as controller 26 that controls the movement of wire 30. Wire 30 may be embedded in fabric 20 and may be configured to move within fabric 20 to obtain a user's attention through tactile sensation. For example, movement of wire 30 may result in vibration of fabric 20 against a user's body, pulsing of fabric 20 against a user's body, pressing of fabric 20 against a user's body, and/or other physical or tactile output from fabric 20 against a user's body.

Wire 30 may be moveable between a first position in which no tactile output is felt by the user (sometimes referred to as a deactivated state) and a second position in which tactile output is felt by the user (sometimes referred to as an activated state). When wire 30 is in the first position, the surface of fabric 20 that rests against a user's skin or body such as interior surface 201 may be relatively smooth, without protrusions or bumps. When wire 30 is in the second position, fabric 20 may have one or more protrusions or bumps that press against the user's skin or body. For example, portions of wire 30 such as portion 28 may press fabric 20 against a user's skin or body when wire 30 is in the second position. Portion 28 may be a kink, curve, twist, bump, protrusion, or other irregularity in wire 30 that, when oriented towards interior surface 201 of fabric 20, forms a corresponding irregularity on interior surface 201 of fabric 20 that can be felt by the user.

In some arrangements, irregularity 28 in wire 30 may be a permanent irregularity in wire 30 or may be an irregularity that is produced in response to control signals from controller 26. In embodiments where portion 28 is a permanent irregularity in wire 30, wire 30 may transition from a first state in which irregularity 28 is oriented away from a user's skin or body such that interior surface 201 of fabric 20 is completely smooth to a second state in which irregularity 28 is oriented towards a user's body such that interior surface 201 of fabric 20 has a bump that presses against the user's body. In embodiments where irregularity 28 is not permanent, wire 30 may transition from a first state in which wire 30 is completely smooth (without any bumps or kinks) such that interior surface 201 of fabric 20 is completely smooth to a second state in which wire 30 includes one or more irregularities such as kink 28 such that interior surface 201 of fabric 20 has a bump that presses against the user's body.

Wire 30 may be formed from a solid metal, metal fibers, metal fibers that are completely or partly coated with plastic, solid plastic, plastic fibers that are coated with metal or that have metal portions, intertwined fibers (e.g., conductive and/or dielectric fibers), or other suitable conductive and/or insulating materials. Wire 30 may, for example, be formed from a thin, string-like piece of metal. Wire 30 may be stiff, may be flexible, or may have both rigid and flexible portions. If desired, wire 30 may be formed from a shape memory substance (e.g., nitinol or other shape memory metal alloys, shape memory polymers, etc.).

Movement of wire 30 may be controlled by controller 26. In some arrangements, controller 26 may be an electromechanical actuator (e.g., an electromechanical actuator such as a linear actuator, a rotary actuator, an actuator based on one or more solenoids, motors, or piezoelectric elements, etc.) that controls the state of wire 30 by physically moving wire 30 within fabric 20. For example, actuator 26 may be a rotary actuator that rotates wire 30 within fabric 20, which in turn rotates protrusion 28 between a position facing towards the user's body to a position facing away from the user's body. In other embodiments, actuator 26 may be a shape memory metal actuator that controls the state of wire 30 using shape memory effects (e.g., the two-way shape memory effect). In this type of arrangement, actuator 26 may control the state of wire 30 by controlling the temperature of wire 30 (e.g., by passing current through shape memory material in wire 30 using a heating element). When wire 30 is maintained at room temperature, the shape memory material of wire 30 may have a first shape that places fabric 20 (or a portion of fabric 20) in a first state (e.g., in which interior surface 201 of fabric 20 is smooth and uniform). When the shape memory material of wire 30 is heated to an elevated temperature (e.g., a temperature above room temperature), the shape memory material of wire 30 may have a second shape that places fabric 20 (or a portion of fabric 20) in a second state (e.g., in which interior surface 201 of fabric 20 includes bumps or other irregularities that are felt by a user wearing fabric 20).

As shown in FIG. 2, controller 26 may be mounted in housing 50 of electronic device 10 and may be coupled to wire 30 in fabric 20. In some arrangements, wire 30 and controller 26 may be detachable from one another so that fabric 20 can be detached from electronic device 10. In other arrangements, wire 30 in fabric 20 may be permanently coupled to controller 26 in electronic device 10. The arrangement of FIG. 2 is merely illustrative, however. If desired, controller 26 may be mounted to or incorporated into fabric 20.

Figure 3:
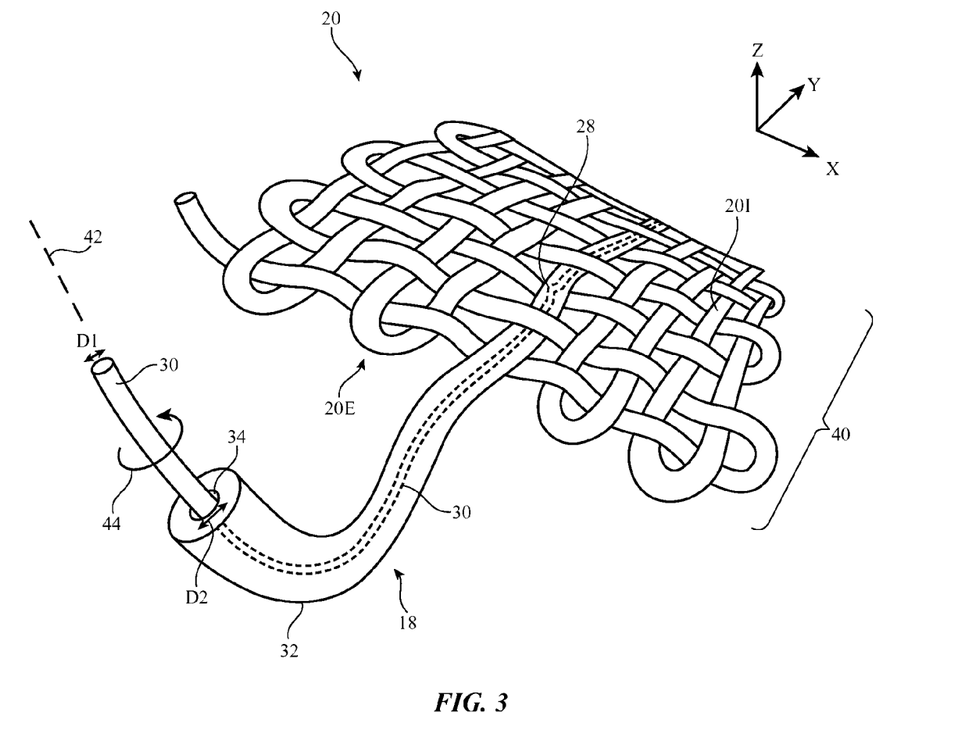
FIG. 3 is a perspective view of illustrative fabric that includes an output device formed from a moveable structure that is incorporated into the fabric in accordance with an embodiment.

FIG. 3 is a perspective view of an illustrative configuration for fabric 20. In the example of FIG. 3, fabric 20 is a woven fabric having fibers 40 (e.g., warp fibers and weft fibers) woven in a plain weave. In general, fabric 20 may include any intertwined fibers 40 (woven, knitted, braided, etc.). The plain weave fabric of FIG. 3 is merely illustrative. Fabric 20 may contain conductive fibers, may contain a mixture of conductive and insulating fibers, or may be formed exclusively from insulating fibers.

As shown in FIG. 3, wire 30 of output device 18 may be enclosed within a hollow tube such as tube 32 having cylindrical inner walls that define an opening such as opening 34 in which wire 30 is located. Tube 32 may be formed from a flexible material such as polytetrafluoroethylene (PTFE), polyethylene, other flexible polymer, an elastomeric material such as silicone elastomer, or other suitable materials. Forming tube 32 from a flexible or deformable material allows the interior and exterior surfaces of tube 32 to be deformed in response to movement of wire 30 and kink 28. By enclosing wire 30 within tube 32, movement of wire 30 does not induce any relative motion between fabric 20 and a user's body (e.g., fabric 20 does not rub or slide on a user's skin in response to movement of wire 30).

In the example of FIG. 3, tube 32 is intertwined (e.g., interwoven) with fibers 40 of fabric 20. This is, however, merely illustrative. If desired, tube 32 may be sandwiched between two layers of fabric 20, may be stitched into fabric 20, may be attached to the surface of edge of fabric 20, or may be integrated with fabric 20 using any other suitable method. There may be only one tube 32 containing a moveable wire 30 in fabric 20 or fabric 20 may include multiple tubes 32, each with an associated moveable wire 30. Tubes 32 may be separated into multiple layers of fabric 20 or may be formed in a single layer of fabric 20. Tubes 32 may be stacked (e.g., may overlap each other in fabric 20) or may be formed in different regions of fabric 20 (e.g., a first tube 32 may be formed in a first portion of fabric 20 and a second tube 32 may be formed in a second portion of fabric 20).

The diameter D2 of opening 34 (sometimes referred to as a bore) in tube 32 may be about equal to the diameter D1 of wire 30 or may be slightly greater than the diameter D1 of wire 30. The diameter D2 of opening 34 in tube 32 may, for example, be chosen such that irregularity 28 in wire 30 is able to touch the inner surface of tube 32 and deform the outer surface of tube 32 in response to control signals from controller 26 (FIG. 2).

The surface of fabric 20 that rests against a user's skin or body such as interior surface 20I of fabric 20 may have different surface features depending on the state of output device 18. For example, interior surface 20I may be smooth and uniform when wire 30 is not actuated and may include bumps or protrusions when wire 30 is actuated (e.g., during an alert). When it is desired to provide physical output from fabric 20 to a user, controller 26 may actuate output device 18 to move wire 30 such that irregularity 28 forms a corresponding irregularity in fabric 20 that can be physically felt by a user wearing or carrying fabric 20.

In some embodiments, controller 26 may actuate output device 18 to provide output to a user by rotating wire 30 about its longitudinal axis 42 (e.g., in direction 44 of FIG. 3 or in a direction opposite to direction 44). This in turn causes protrusion 28 to also rotate about longitudinal axis 42 of wire 30. When protrusion 28 is rotated so as to face away from interior surface 20I of fabric 20 (e.g., to face towards exterior surface 20E of fabric 20), interior surface 20I may be smooth against the user's body. When protrusion 28 is rotated so as to face towards interior surface 20I of fabric 20, interior surface 20I may include a corresponding protrusion that aligns with protrusion 28 of wire 30. This protrusion (extending upward in the z-direction relative to surface 20I) may be physically felt by the user wearing or holding fabric 20 and may therefore serve as a means of obtaining the user's attention (e.g., during an alert such as an incoming telephone call alert, a message alert, a timer done alert, an alarm alert, etc.).

Controller 26 may rotate wire 30 once during an alert such that protrusion 28 presses fabric 20 against the user's body only once, or controller 26 may rotate wire 30 repeatedly during an alert such that protrusion 28 pulses fabric 20 against the user's body repeatedly. The time between pulses (moments of pressure against the user's skin on which interior surface 20I rests) may be controlled and adjusted by adjusting the speed at which wire 30 is rotated. If desired, controller 26 may rotate wire 30 a different number of times and/or at different speeds for different types of alerts. For example, controller 26 may rotate wire 30 at a relatively low speed for one type of alert and at a relatively high speed for another type of alert. Some alerts may be presented using only one rotation of wire 30, while others may be presented using multiple rotations of wire 30.

Figure 4A:
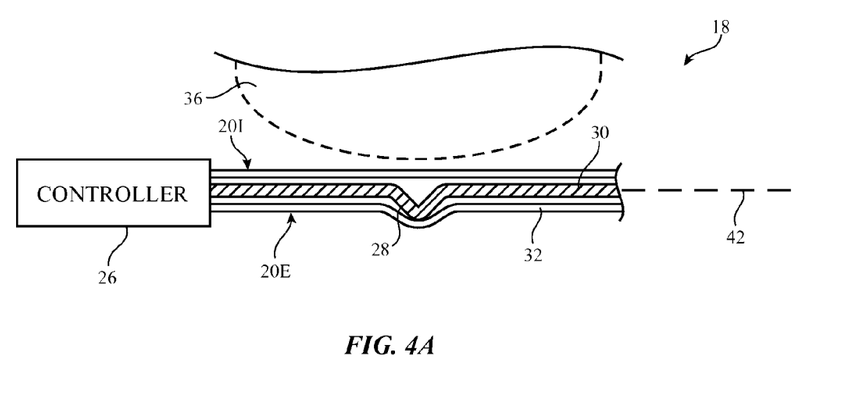
FIG. 4A is a cross-sectional side view of an illustrative output device having a controller that rotates a wire within a flexible tube in accordance with an embodiment.
Figure 4B:
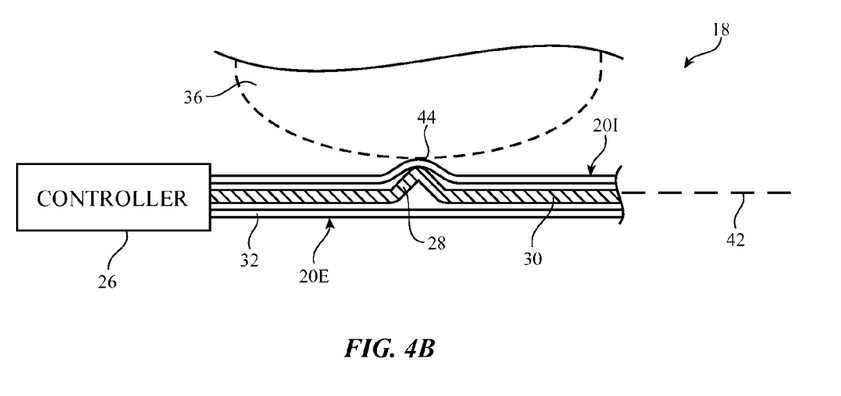
FIG. 4B is a cross-sectional side view of the output device of FIG. 4A in an activated state in accordance with an embodiment.

Cross-sectional side views of output device 18 illustrating the operation of output device 18 according to one suitable arrangement are shown in FIGS. 4A and 4B. In the example of FIG. 4A, output device 18 is in a deactivated state in which interior surface 20I of fabric 20 is smooth and uniform against object 36 (e.g., a portion of a user's body). In the deactivated state, controller 26 has rotated wire 30 such that protrusion 28 faces away from object 36. If desired, protrusion 28 may deform exterior surface 20E of fabric 20 when rotated away from interior surface 20I, or exterior surface 20E of fabric 20 may remain smooth even when protrusion 28 faces towards exterior surface 20E. A smooth, unaffected surface may be achieved by adjusting the position of wire 30 within tube 32 or by forming one or more fabric layers over tube 32 to form exterior surface 20E of fabric 20.

When it is desired to obtain the user's attention using output device 18, controller 26 may rotate wire about longitudinal axis 42 to place output device 18 in activated state, as shown in FIG. 4B. In the activated state, wire 30 has been rotated such that protrusion 28 faces towards object 36. When faced towards object 36, protrusion 28 presses the wall of tube 32 outward to form a protrusion on the exterior surface of tube 32. This in turn forms a corresponding protrusion 44 on the interior surface 20I of fabric 20 that aligns with protrusion 28. Protrusion 44 may press against the user's body and may therefore serve as a means of obtaining the user's attention. If desired, the outer surface of tube 32 may press directly against object 36 or the outer surface of tube 32 may press against fibers or a layer of fabric that in turn presses against object 36.

Figure 5A:
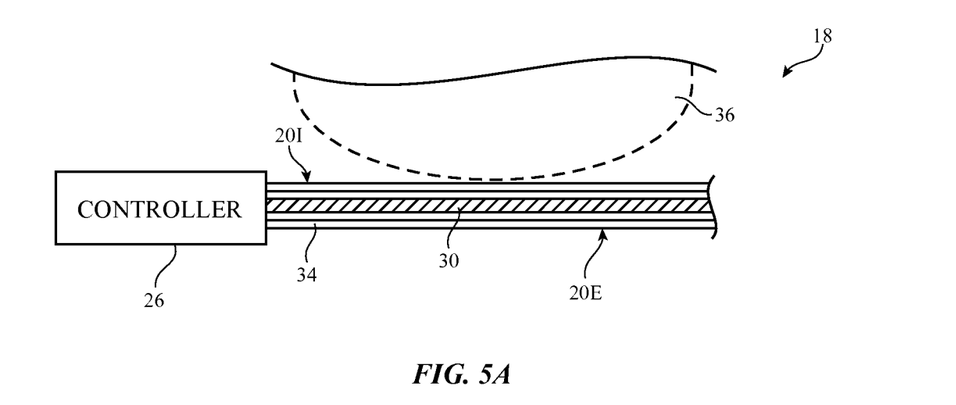
FIG. 5A is a cross-sectional side view of an illustrative output device having a controller that deforms a wire within a flexible tube in accordance with an embodiment.
Figure 5B:
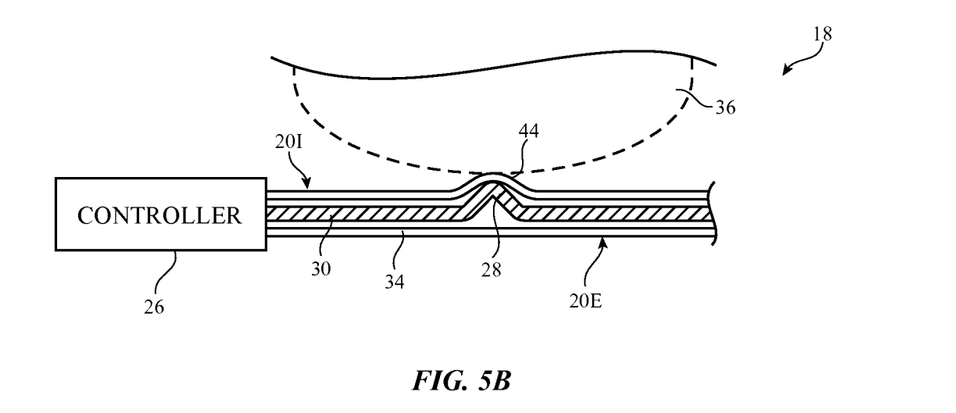
FIG. 5B is a cross-sectional side view of the output device of FIG. 5A in an activated state in accordance with an embodiment.

Cross-sectional side views of output device 18 illustrating the operation of output device 18 according to another suitable arrangement are shown in FIGS. 5A and 5B. In the example of FIG. 5A, output device 18 is in a deactivated state in which interior surface 20I of fabric 20 is smooth and uniform against object 36 (e.g., a portion of a user's body). In the deactivated state, controller 26 has placed wire 30 in a straight configuration in which wire 30 does not press against the walls of tube 32. Wire 30 may, for example, be formed from shape memory material such as nitinol. When the shape memory material that forms wire 30 is maintained at a first temperature (e.g., room temperature), wire 30 may have a first shape (e.g., the straight shape shown in FIG. 5A). When the shape memory material that forms wire 30 is heated to an elevated temperature (e.g., a temperature above room temperature), the shape memory material may have a second shape (e.g., the bent shape as shown in FIG. 5B). The temperature (and shape) of wire 30 may be controlled by controlling how much current flows through wire 30 using controller 26 (e.g., using a heating element in controller 26).

When it is desired to obtain the user's attention using output device 18, controller 26 may adjust the shape of wire 30 (e.g., by heating wire 30 to an elevated temperature) to place output device 18 in activated state, as shown in FIG. 5B. In the activated state, wire 30 has a protrusion 28 that faces towards object 36. When faced towards object 36, protrusion 28 presses the wall of tube 32 outward to form a protrusion on the exterior surface of tube 32. This in turn forms a corresponding protrusion 44 on the interior surface 201 of fabric 20 that aligns with protrusion 28. Protrusion 44 may press against the user's body and may therefore serve as a means of obtaining the user's attention. If desired, the outer surface of tube 32 may press directly against object 36 or the outer surface of tube 32 may press against fibers or a layer of fabric that in turn presses against object 36.

Figure 6A:
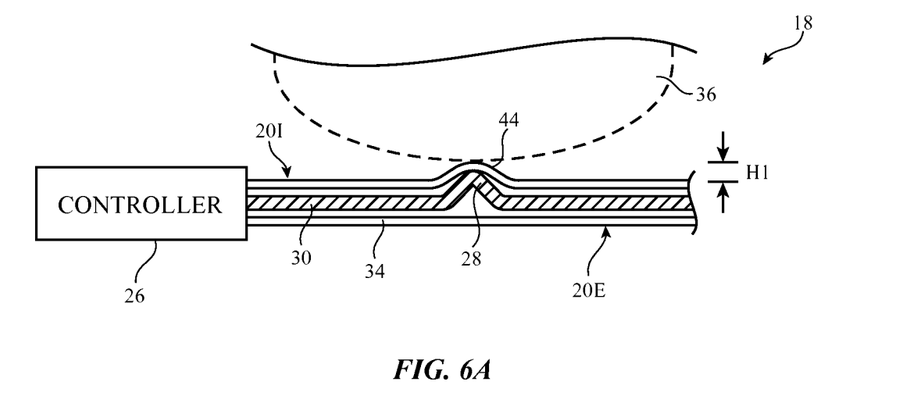
FIG. 6A is a cross-sectional side view of an illustrative output device having a controller that changes the shape or size of an irregularity in a wire within a flexible tube in accordance with an embodiment.
Figure 6B:
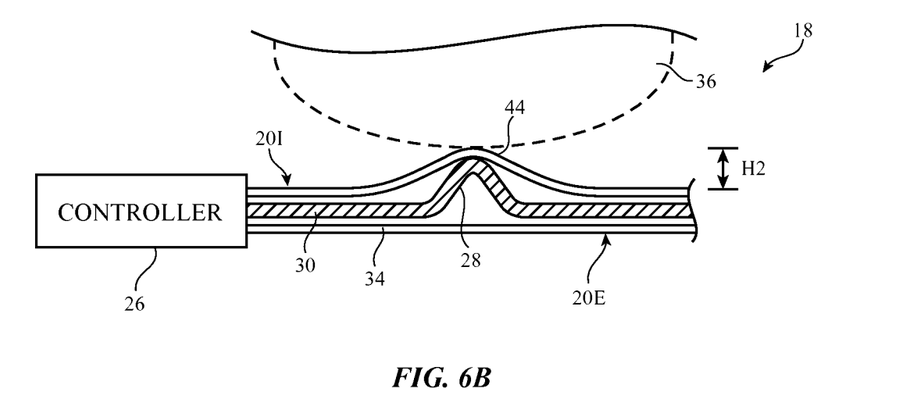
FIG. 6B is a cross-sectional side view of the output device of FIG. 6A in an activated state in accordance with an embodiment.

Cross-sectional side views of output device 18 illustrating the operation of output device 18 according to another suitable arrangement are shown in FIGS. 6A and 6B. In the example shown in FIGS. 6A and 6B, controller 26 adjusts the output provided by output device 18 by adjusting the height of the protrusion 28 and the height of the corresponding protrusion 44 on interior surface 201 of fabric 20. For example, in the configuration of FIG. 6A, protrusion 44 has a height H1 relative to the smooth (non-raised) portion of interior surface 201. In the configuration of FIG. 6B, protrusion 44 has a height H2 relative to the smooth (non-raised) portion of interior surface 201, where H2 is greater than H1. Wire 30 may, for example, be formed from shape memory material such as nitinol. When the shape memory material that forms wire 30 is maintained at a first temperature (e.g., room temperature), wire 30 may have a first shape (e.g., with a smaller protrusion 28 as shown in FIG. 6A). When the shape memory material that forms wire 30 is heated to an elevated temperature (e.g., a temperature above room temperature), the shape memory material may have a second shape (e.g., with a larger protrusion 28 as shown in FIG. 6B). The temperature (and shape) of wire 30 may be controlled by controlling how much current flows through wire 30 using controller 26 (e.g., using a heating element in controller 26).

The configurations of FIGS. 6A and 6B may be used to provide different types of output to a user from fabric 20. For example, some alerts (e.g., less urgent alerts) may be presented by lightly pulsing the smaller protrusion 28 of FIG. 6A against object 36, whereas other alerts (e.g., more urgent alerts) may be presented by pulsing the larger protrusion 28 of FIG. 6B against object 36.

Figure 7:
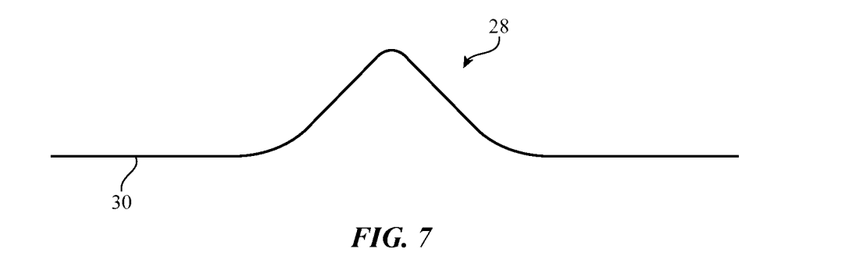
FIG. 7 is a side view of an illustrative wire having an angled protrusion that may be used to provide tactile output from a fabric to a user in accordance with an embodiment.
Figure 8:
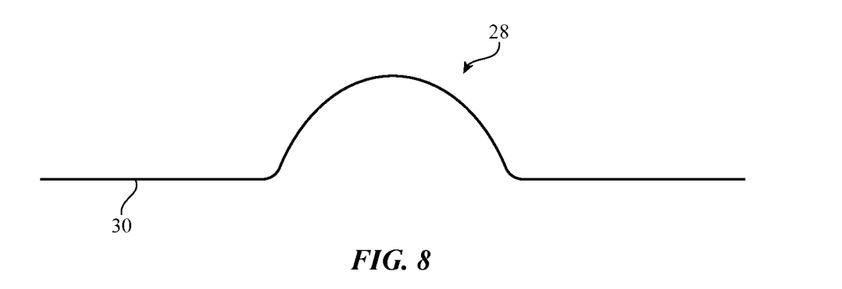
FIG. 8 is a side view of an illustrative wire having an rounded protrusion that may be used to provide tactile output from a fabric to a user in accordance with an embodiment.
Figure 9:
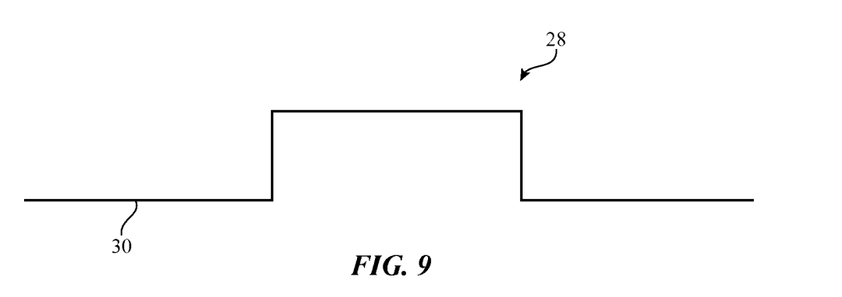
FIG. 9 is a side view of an illustrative wire having a rectangular protrusion that may be used to provide tactile output from a fabric to a user in accordance with an embodiment.

FIGS. 7, 8, and 9 show illustrative shapes that irregularity 28 in wire 30 may have. In the example of FIG. 7, wire 30 is bent to form a triangular shaped kink 28 in wire 30. With this type of arrangement, a minimal amount of surface area A1 of wire 30 comes into contact with the inner walls of tube 32 (FIG. 3). The angled kink 28 of FIG. 7 may therefore be used to produce small points of pressure against the user's body.

In the example of FIG. 8, wire 30 is bent to form a curved (e.g., semicircular) bump 28 in wire 30. With this type of arrangement, the surface area A2 of wire 30 that comes into contact with the inner walls of tube 32 (FIG. 3) may be somewhat larger than that of the angled kink 28 of FIG. 7. The curved bump 28 of FIG. 8 may be used to produce broader regions of pressure against the user's body.

In the example of FIG. 9, wire 30 is bent to form a rectangular shaped kink 28 in wire 30. With this type of arrangement, the surface area A3 of wire 30 that comes into contact with the inner walls of tube 32 (FIG. 3) may be larger than that of the rounded bump 28 of FIG. 8. The rectangular kink 28 of FIG. 9 may be used to produce larger regions of continuous pressure against the user's skin or body.

Figure 10:
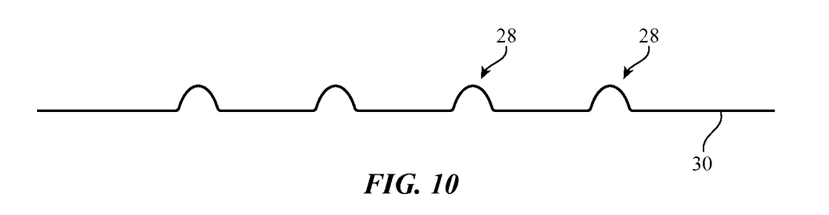
FIG. 10 is a side view of an illustrative wire that may be used to provide tactile output from a fabric to a user in which the wire includes multiple protrusions distributed along the length of the wire in accordance with an embodiment.
Figure 11:
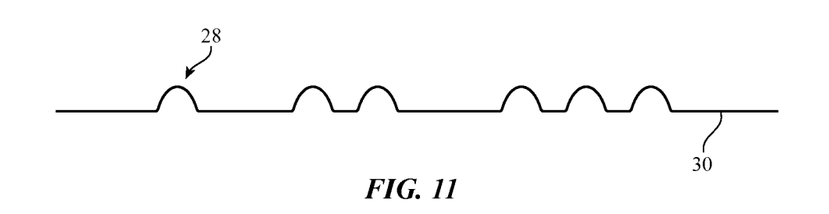
FIG. 11 is a side view of an illustrative wire that may be used to provide tactile output from a fabric to a user in which the wire includes multiple protrusions distributed with different densities along the length of the wire in accordance with an embodiment.
Figure 12:
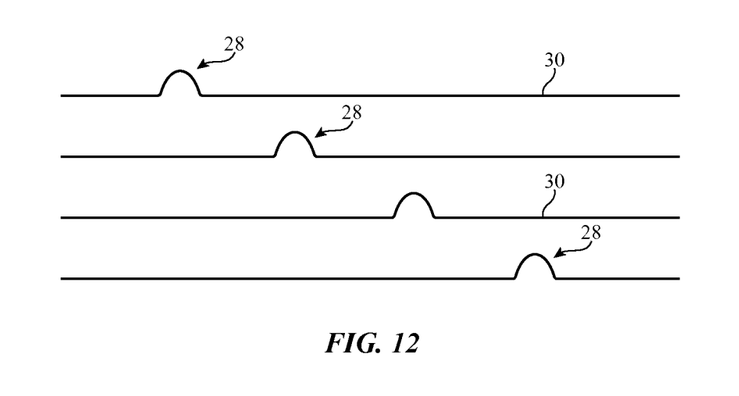
FIG. 12 is a side view of an illustrative group of wires that may be used to provide tactile output from a fabric to a user in which each wire in the group of wires includes a protrusion in accordance with an embodiment.

FIGS. 10, 11, and 12 show illustrative patterns of irregularities that may be formed in wire 30. In the example of FIG. 10, a single wire 30 includes multiple bumps 28. Bumps 28 in wire 30 may be uniformly or non-uniformly distributed along the length of wire 30. With this type of arrangement, actuation of wire 30 may create the sensation of a line of pressure against the user's body.

In the example of FIG. 11, a single wire 30 includes multiple bumps 28 formed with different densities along the length of wire 30. For example, some regions of wire 30 may include one bump 28 in a given length of wire 30, while other regions of wire 30 may include a series of closely spaced bumps 28 in a given length of wire 30.

In the example of FIG. 12, multiple wires 30 are arranged adjacently to one another (e.g., in parallel lines) and each wire 30 includes one or more bumps 28. For example, bumps 28 may be laterally offset from one another (e.g., may not be directly aligned or overlapping with one another, as shown in the example of FIG. 12) or may, if desired, be directly aligned and overlapping with one another. With this type of arrangement, the simultaneous actuation of bumps 28 may create the sensation of a line of pressure against the user's body or skin.

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
   fabric having a surface;
   a wire incorporated into the fabric, wherein the wire has a longitudinal axis; and
   control circuitry coupled to the wire that rotates the wire about the longitudinal axis to form a bump on the surface of the fabric.

2. The apparatus defined in claim 1 further comprising an electronic device coupled to the fabric, wherein the control circuitry is mounted in the electronic device.

3. The apparatus defined in claim 2 wherein the control circuitry comprises a rotary actuator.

4. The apparatus defined in claim 1 wherein the wire has smooth portions and at least one protruding portion that protrudes from the smooth portions and wherein the bump on the surface of the fabric is aligned with the protruding portion of the wire.

5. The apparatus defined in 4 wherein the wire is rotated between first and second positions, wherein the protruding portion of the wire faces away from the surface in the first position so that the surface of the fabric is flat over the protruding portion when the wire is in the first position, and wherein the protruding portion of the wire faces towards the surface in the second position so that the bump is formed on the surface of the fabric over the protruding portion when the wire is in the second position.

6. The apparatus defined in claim 4 further comprising:
   a tube having opposing interior and exterior surfaces, wherein the interior surface defines an opening in the tube, wherein the wire is located in the opening, and wherein the protruding portion of the wire presses against the interior surface of the tube.

7. The apparatus defined in claim 6 wherein the tube comprises flexible polymer.

8. The apparatus defined in claim 7 wherein the fabric comprises fibers and wherein the tube is intertwined with the fibers.

9. The apparatus defined in claim 1 wherein the fabric forms a wrist band and wherein the surface of the fabric forms an interior surface of the wrist band.

10. The apparatus defined in claim 1 wherein the wire comprises nitinol.

11. An electronic device, comprising:
control circuitry mounted in a housing;
fabric coupled to the housing; and
a moveable structure in the fabric that moves in response to control signals from the control circuitry to produce at least one protrusion on a surface of the fabric, wherein the moveable structure has an irregularity that raises a localized portion of the surface of the fabric to produce the at least one protrusion.

12. The electronic device defined in claim 11 wherein the control circuitry comprises an electromechanical rotary actuator.

13. The electronic device defined in claim 11 wherein the moveable structure comprises shape memory material and wherein the control circuitry controls a temperature of the shape memory material.

14. The electronic device defined in claim 11 wherein the moveable structure is moveable between first and second positions, wherein the surface of the fabric is smooth when the moveable structure is in the first position, and wherein the at least one protrusion is produced on the surface of the fabric when the moveable structure is in the second position.

15. The electronic device defined in claim 14 wherein the fabric comprises fibers and wherein the moveable structure is intertwined with the fibers.

16. Apparatus, comprising:
an electromechanical actuator mounted in an electronic device housing;
fabric coupled to the electronic device housing; and
a wire embedded in the fabric and coupled to the electromechanical actuator, wherein the electromechanical actuator adjusts a position of the wire to form a protrusion on the fabric, wherein the wire has a kink interposed between smooth portions of the wire and wherein the protrusion on the fabric overlaps the kink in the wire.

17. The apparatus defined in claim 16 wherein the electromechanical actuator comprises an electromechanical rotary actuator that adjusts the position of the wire by rotating the wire.

18. The apparatus defined in claim 17 wherein the wire is enclosed within a flexible polymer tube.

19. The apparatus defined in claim 18 wherein the fabric comprises threads and wherein the tube is intertwined with the threads.

* * * * *